(12) United States Patent
Muehlleitner

(10) Patent No.: US 11,613,853 B2
(45) Date of Patent: Mar. 28, 2023

(54) DEVICE FOR WELDING A RAIL JOINT OF A TRACK

(71) Applicant: Plasser & Theurer Export von Bahnbaumaschinen GmbH, Vienna (AT)

(72) Inventor: Heinz Muehlleitner, Neidling (AT)

(73) Assignee: Plasser & Theurer Export von Bahnbaumaschinen GmbH, Vienna (AT)

( * ) Notice: Subject to any disclaimer, the term of this patent is extended or adjusted under 35 U.S.C. 154(b) by 708 days.

(21) Appl. No.: 16/615,332

(22) PCT Filed: Jun. 4, 2018

(86) PCT No.: PCT/EP2018/064544
§ 371 (c)(1),
(2) Date: Nov. 20, 2019

(87) PCT Pub. No.: WO2019/007599
PCT Pub. Date: Jan. 10, 2019

(65) Prior Publication Data
US 2020/0199825 A1    Jun. 25, 2020

(30) Foreign Application Priority Data
Jul. 4, 2017 (AT) .................. A 278/2017

(51) Int. Cl.
*E01B 29/46* (2006.01)
*B23K 11/04* (2006.01)
(Continued)

(52) U.S. Cl.
CPC .............. *E01B 29/46* (2013.01); *B23K 11/04* (2013.01); *B23K 11/046* (2013.01);
(Continued)

(58) Field of Classification Search
CPC .. B23K 11/04; B23K 11/046; B23K 37/0435; B23K 2101/26; E01B 29/20; E01B 31/00
See application file for complete search history.

(56) References Cited

U.S. PATENT DOCUMENTS 4,399,753 A * 8/1983 Theurer ................. E01B 27/17
  104/7.2
4,983,801 A * 1/1991 Theurer ................. E01B 29/46
  219/97
(Continued)

FOREIGN PATENT DOCUMENTS

AT        402830 B     9/1997
DE     42 13 288 A1   11/1993
(Continued)

OTHER PUBLICATIONS

International Search Report of PCT/EP2018/064544, dated Jul. 17, 2018.
(Continued)

*Primary Examiner* — Brian W Jennison
(74) *Attorney, Agent, or Firm* — Collard & Roe, P.C.

(57) ABSTRACT

A device for welding a rail joint of a track, comprising two rail clamping devices spaced from one another in a rail longitudinal direction which are connected to one another via push rods to press rail ends apart prior to welding. In this, it is provided that at least one rail clamping device is coupled to a transverse displacement device for flush-aligning the rail ends after being pressed apart.

13 Claims, 5 Drawing Sheets

(51) Int. Cl.
  *B23K 37/04* (2006.01)
  *E01B 29/44* (2006.01)
  *B23K 101/26* (2006.01)

(52) U.S. Cl.
  CPC .......... *B23K 37/0435* (2013.01); *E01B 29/44* (2013.01); *B23K 2101/26* (2018.08)

(56) References Cited

U.S. PATENT DOCUMENTS

| | | | |
|---|---|---|---|
| 5,136,140 A * | 8/1992 | Theurer | .................. E01B 29/46 219/161 |
| 10,570,573 B2 | 2/2020 | Muehlleitner | |
| 2003/0196565 A1* | 10/2003 | Decker | .................. E01B 29/20 104/7.2 |
| 2008/0823052 | 7/2006 | Lichtberger et al. | |
| 2006/0261044 A1* | 11/2006 | Theurer | .................. B23K 11/04 219/53 |
| 2011/0168675 A1* | 7/2011 | Theurer | ............. B23K 11/0073 219/53 |

FOREIGN PATENT DOCUMENTS

| | | |
|---|---|---|
| DE | 20 2012 003 875 U1 | 5/2012 |
| DE | 20 2015 006 320 U1 | 10/2015 |
| EP | 0 455 178 A1 | 11/1991 |
| EP | 0 566 941 A1 | 10/1993 |
| EP | 1 682 304 B1 | 7/2006 |
| EP | 2 315 877 B1 | 5/2011 |
| WO | 2016/050337 A1 | 4/2016 |

OTHER PUBLICATIONS

Austrian Search Report in Austrian Application No. A 278/2017 dated May 17, 2018.

* cited by examiner

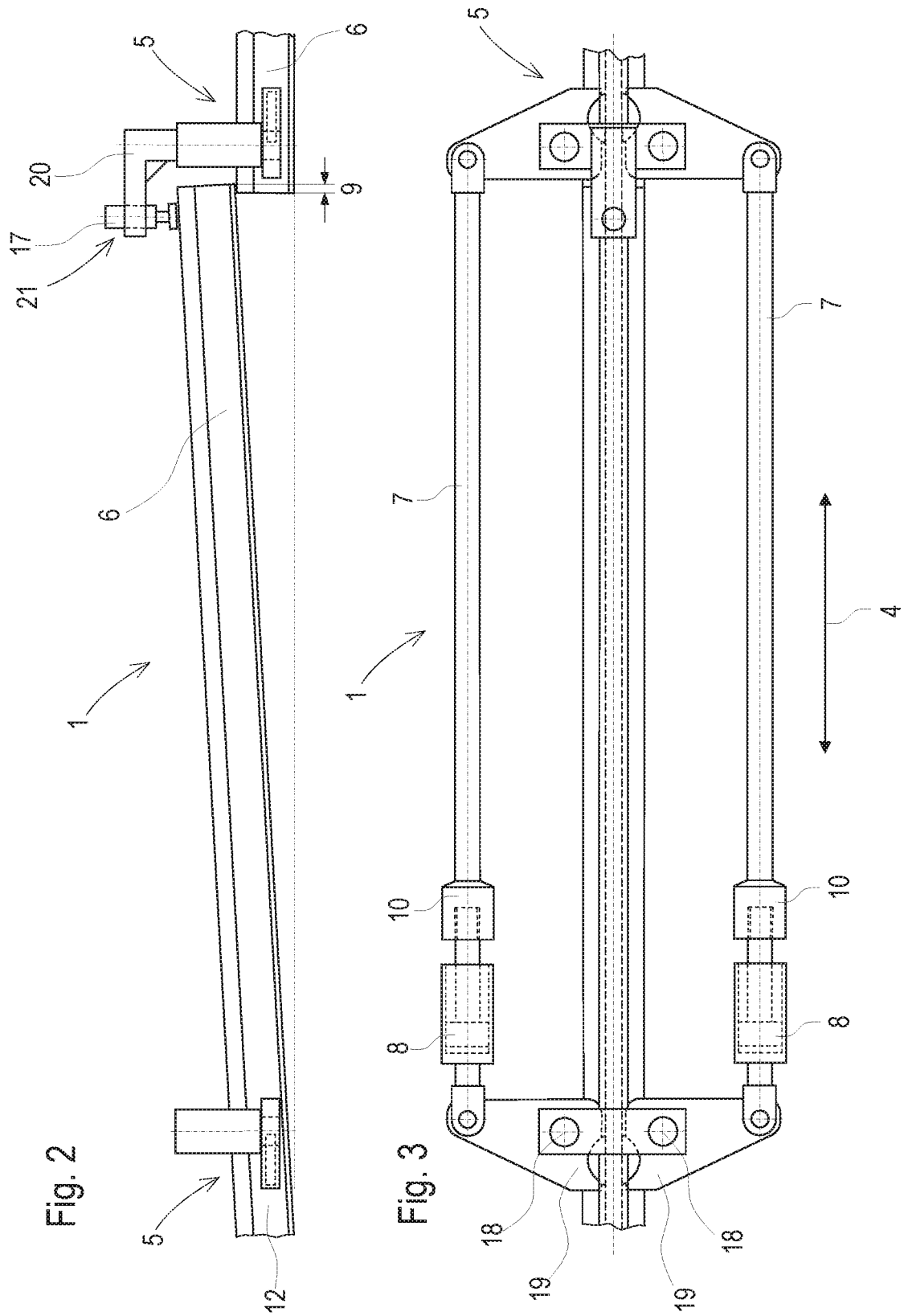

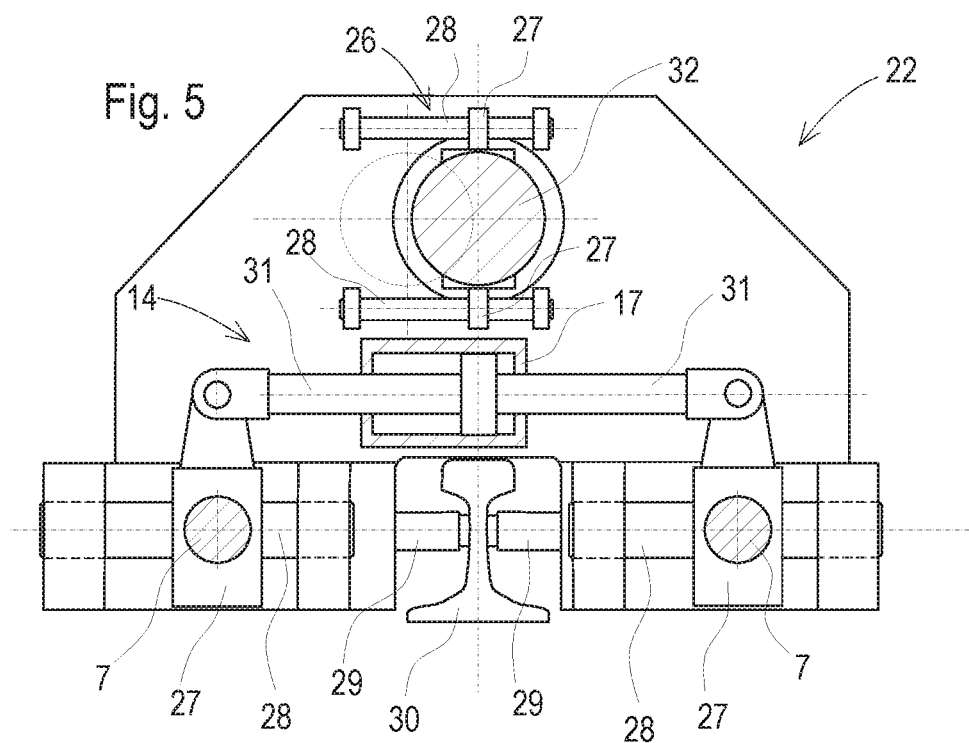
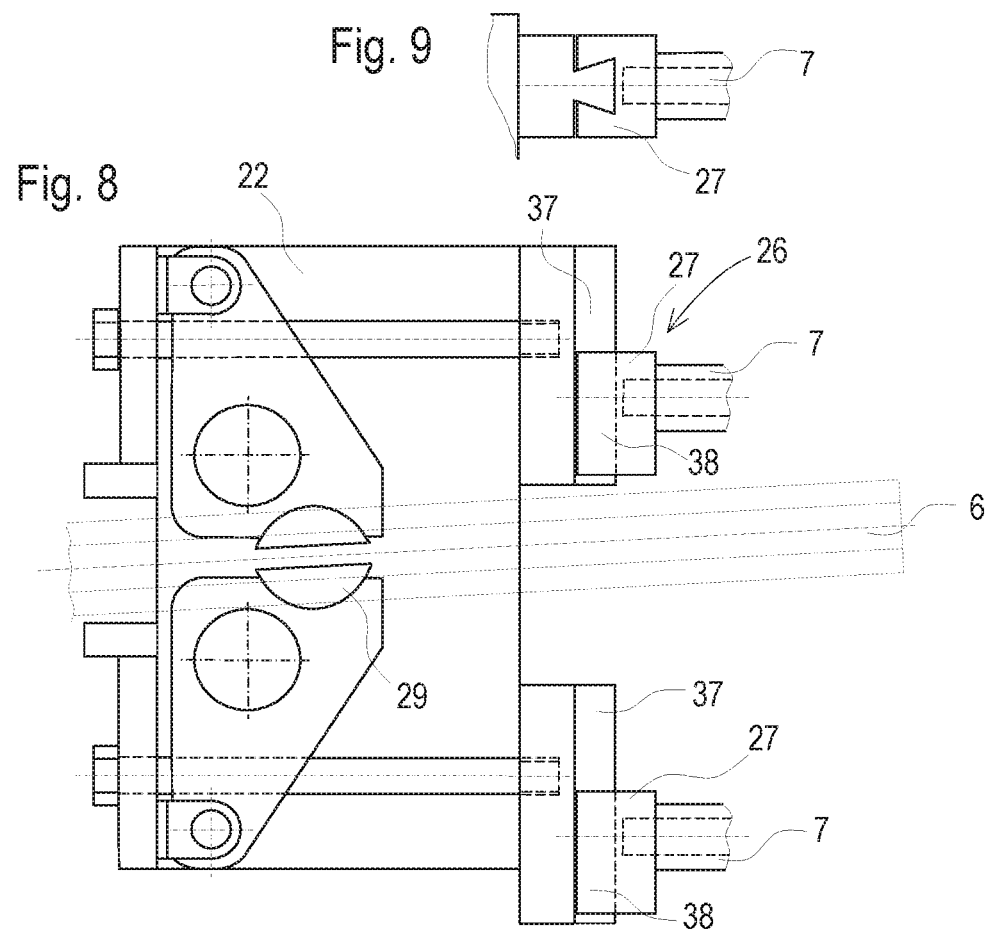

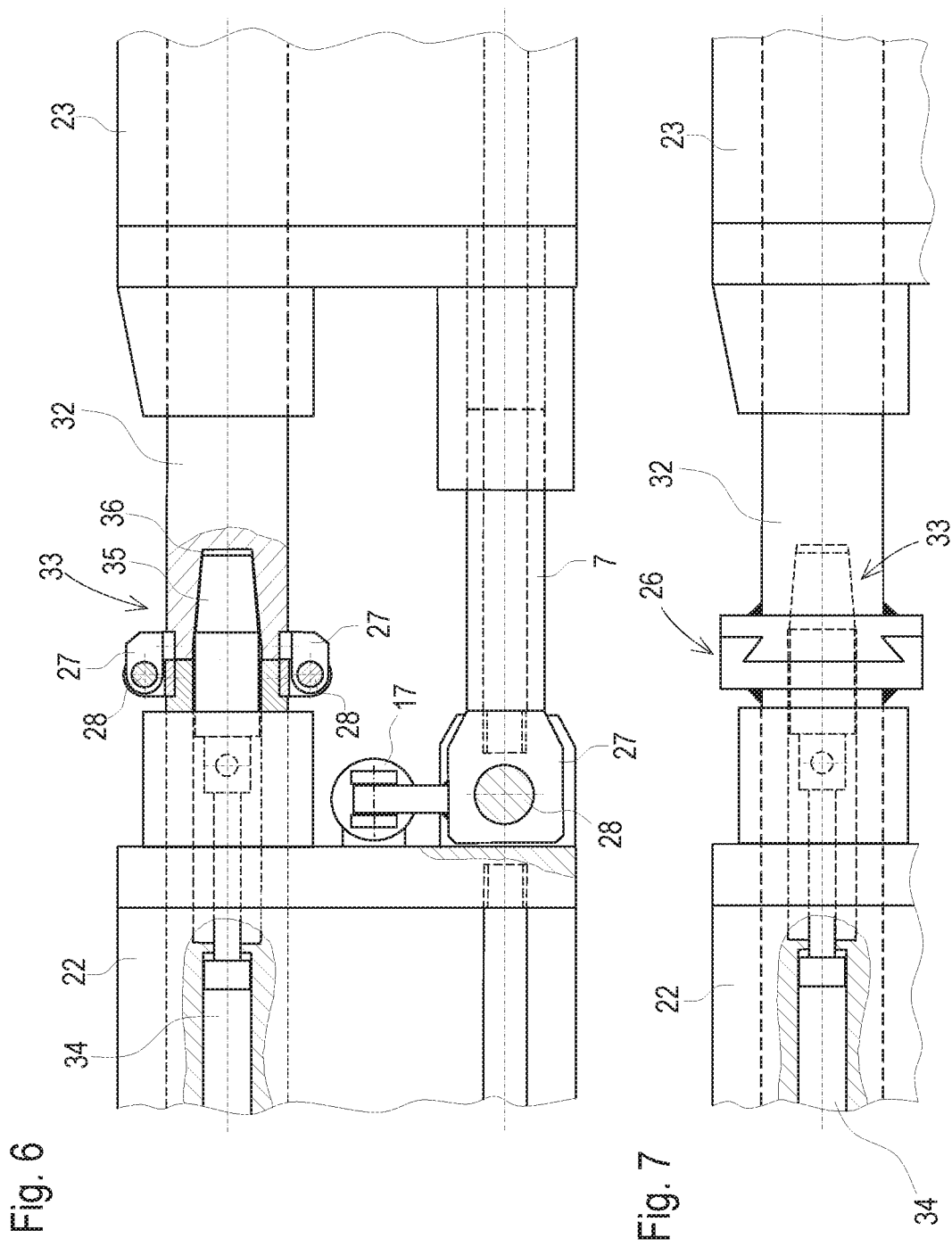

DEVICE FOR WELDING A RAIL JOINT OF A TRACK

CROSS REFERENCE TO RELATED APPLICATIONS

This application is the National Stage of PCT/EP2018/064544 filed on Jun. 4, 2018, which claims priority under 35 U.S.C. § 119 of Austrian Application No. A 278/2017 filed on Jul. 4, 2017, the disclosures of which are incorporated by reference. The international application under PCT article 21(2) was not published in English.

FIELD OF TECHNOLOGY

The invention relates to a device for welding a rail joint of a track, comprising two rail clamping devices spaced from one another in a rail longitudinal direction which are connected to one another via push rods to press rail ends apart prior to welding. The invention further relates to a method for welding a rail joint by means of such a device.

PRIOR ART

Mobile welding units are increasingly used for welding together two rails of a track. In this, differing from the older thermite welding, the rail ends are fused without the addition of foreign materials. However, this results in a slight shortening of the rails which has to be compensated.

As a rule, at first several rail sections are welded with the rail fastenings being loosened. Then, in the course of a closure welding, the rail line receives its longitudinal tension prescribed for the prevailing ambient temperature. At temperatures below the mean annual temperature (neutral temperature), a so-called rail pulling device is used (DE 20 2015 006 320 UI). In modern welding units, such a device is already integrated (EP 2 315 877 A1). At higher temperatures, the rail ends first have to be pressed apart by means of additional devices (EP 1 682 304 A1).

Currently, welding units can only be used in places where the rail material consumption is compensated by a longitudinal displacement of the rail. When removing an old rail joint and inserting an intermediate rail piece, a longitudinal displacement has heretofore not been possible.

For thermite welding, pushing- and pulling devices are known in order to weld the rails to be welded with a prescribed longitudinal tension (DE 42 13 288 A1). By means of a hydraulic cylinder, a change in length of the rails is effected in order to compensate a deviation of the momentary rail temperature from the neutral temperature. Depending on the temperature level, this takes place by pushing apart or pulling together the rail ends to be welded.

SUMMARY OF THE INVENTION

It is the object of the invention to provide an improvement over the prior art for a device of the type mentioned at the beginning.

According to the invention, this object is achieved by way of a device according to claim 1 and a method according to claim 13. Advantageous embodiments of the invention become apparent from the dependent claims.

The invention provides that at least one rail clamping device is coupled to a transverse displacement device for flush-aligning the rail ends after being pressed apart. As a result, in the subsequent step the flush-aligned rail ends can be welded to one another by means of a welding unit, wherein a compressive stress built up in the rail can be reduced to a longitudinal tension (equalling zero at neutral temperature) as specified by the material burning off.

In an advantageous embodiment of the invention it is provided that the transverse displacement device comprises a hydraulic cylinder for applying a transverse displacement force. The hydraulic cylinder ensures a long useful life in working operations and precise accuracy of adjustment in order to align the two rail ends precisely with one another.

In addition it is advantageous if the transverse displacement device has a support device for support on a rail line extending parallel to the rail ends to be welded. The support device is fastened to the rail line, and the rail to be displaced in the transverse direction is aligned parallel to thereto in a simple manner.

A further advantageous embodiment of the invention provides that the transverse displacement device has a jib arm, and that a pressing device fastened to the jib arm is arranged for transverse displacement of a rail end. The pressing device arranged on the jib arm presses the rail end to be aligned in the direction of the second rail end until these are flush-aligned with one another in order to weld them together in the next step.

A useful further development provides that the transverse displacement device comprises transverse guides by means of which the push rods are guided for transverse adjustment. As a result, the push rods together with the rail clamping devices and the two rail ends to be welded are flush-aligned with one another.

In this, it is favourable if the transverse guides have gliding shafts on which gliding blocks arranged at the ends of the push rods are mounted. In this way, one rail clamping device is coupled to the gliding shafts, and the other rail clamping device is coupled to the gliding blocks. Such an arrangement is resistant to dust and dirt which occurs during working operations.

Another advantageous variant provides that the transverse guides have gliding profiles, and that gliding blocks arranged at the ends of the push rods have corresponding counter-profiles. The gliding profiles and their corresponding counter-profiles represent a further resilient and structurally simple solution.

Another embodiment of the invention provides that the device is designed as an integrated welding machine. As a result, it is not necessary after the aligning to set the welding unit upon the rail ends to be welded, amounting to great savings in cost and time.

In this, it advantageous if the one rail clamping device is arranged in a first welding head half, and if the other rail clamping device is arranged in a second welding head half. In this, the welding machine is arranged on a crane jib of a vehicle, in particular a rail vehicle, as a so-called welding head. The two welding head halves including the rail clamping devices are coupled to the transverse displacement device, wherein the associated hydraulic cylinder aligns the rail ends laterally flush with one another.

It is also advantageous if the two welding head halves can be fixed relative to one another in the transverse direction by means of a locking device. After alignment of the two rail ends, the locking device provides for a stable fixation. Additionally, the locking device increases the stiffness of the welding machine during the welding operation.

In this, it is useful if the locking device comprises a pin, displaceable in the rail longitudinal direction, which is arranged on the first welding head half, and if the second welding head half has a guide rod with a front-end bore which receives the pin in the locked position. After the lateral alignment of the two welding head halves, the pin of the first welding head half is inserted in the bore of the second welding head half.

A further advantageous embodiment of the invention provides that the welding machine is designed as a welding head for flash-butt welding. With this it is possible to carry out an energy-efficient and high-quality welding in a small space.

The method according to the invention is characterized in that, with the rail ends overlapping, one rail end is clamped in the one rail clamping device and the other rail end is clamped in the other rail clamping device, that the two rail ends are pressed apart until there is no more overlapping, that the rail ends are flush-aligned with one another by means of the transverse displacement device, and that the rail ends are welded to one another. With this, a cost-effective method is created which is distinguished especially by great time savings.

In particular, it is possible to exchange very short rail pieces. For example, a rail joint produced by thermite welding can be replaced in a simple manner in that a piece of rail a few meters in length is cut out. As replacement, a slightly longer rail piece (intermediate rail piece) is welded first to one cut end of the rail, wherein it overlaps the other cut end of the rail. When welding the second rail piece end, the overlapping is used, according to the invention, for compensating the material consumption.

In a further development of the method according to the invention, the rail ends are moved towards one another in a controlled manner during a flash-butt welding procedure. By pressing the two molten rail ends together, a desired longitudinal tension in the rail is achieved.

BRIEF DESCRIPTION OF THE DRAWINGS

The invention will be described below by way of example with reference to the accompanying drawings. There is shown in a schematic manner in.

DESCRIPTION OF THE EMBODIMENTS

Figure 1:
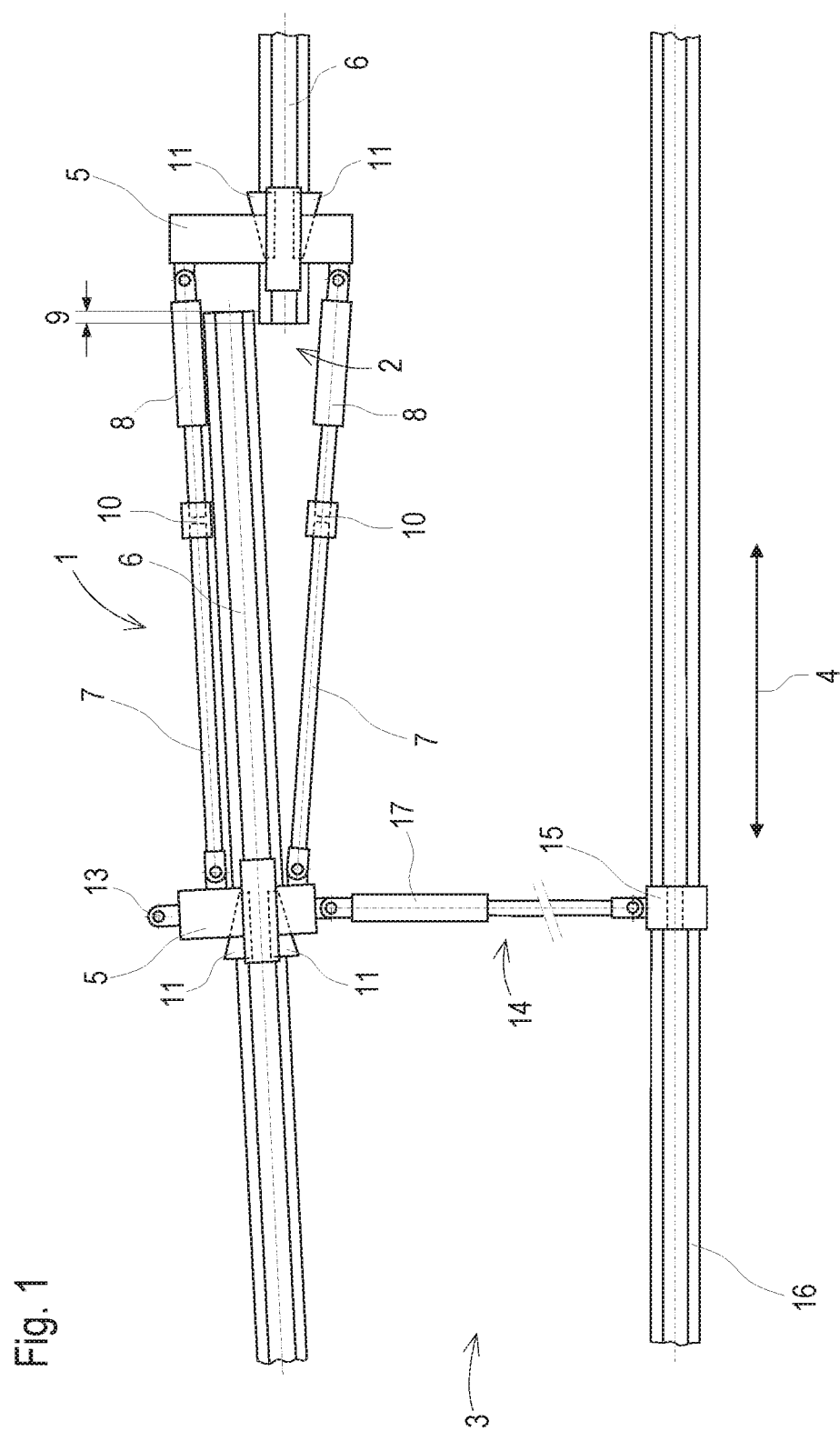
FIG. 1 a top view of a device with support device
FIG. 2 a side view of a device with pressing device
FIG. 3 a top view with regard to FIG. 2
FIG. 4 a top view of a device designed as a welding head
FIG. 5 a welding head half with a transverse displacement device
FIG. 6 a side view of the welding head with a locking device
FIG. 7 a locking device with alternative transverse guide
FIG. 8 a detail view of a transverse displacement device with gliding profiles
FIG. 9 a side view with regard to FIG. 8

FIG. 1 shows a top view of a device 1 for welding a rail joint 2 of an installed track 3, comprising two rail clamping devices 5 spaced from one another in a rail longitudinal direction 4 which are connected to one another via two push rods 7 and each are gripping one rail end 6. Associated with each push rod 7 is a first hydraulic cylinder 8 to press the two rail ends 6 apart from one another so far that no more overlapping 9 exists. Each push rod 7 has a turnbuckle sleeve 10 to precisely align the two rail clamping devices 5 with one another.

The respective rail clamping device 5 is simply pushed from above onto the associated rail end 6 and secured against displacement in a rail longitudinal direction 4 with wedges 11 which engage a rail web 12 in each case. The rail clamping device 5 arranged on the rail end 6 to be displaced has a fastening lug 13 at each side for attaching a transverse displacement device 14. The transverse displacement device 14 comprises a support device 15 for support against a rail line 16 extending parallel to the rail ends 6 to be welded, and a second hydraulic cylinder 17 for producing a transverse displacement force to flush-align the two rail ends 6 with one another.

FIGS. 2 and 3 show a further variant of the device 1 which has rail clamping devices 5 with clamping levers 19 which are pivotable about pivot axes 18 and engage the rail web 12. The rail clamping devices 5 are connected to one another by means of push rods 7 spaced from one another perpendicularly to the rail longitudinal direction 4. Integrated in each of the push rods 7 are a first hydraulic cylinder 8 and a turnbuckle sleeve 10. In the area of the rail overlapping 9, a jib arm 20 is arranged at the respective rail clamping device 5. Fastened to the jib arm 20 is a pressing device 21 having a second hydraulic cylinder 17 for applying the transverse displacement force. With this, after disappearance of the vertical overlapping 9 of the two rail ends 6, these are flush-aligned. Specifically, the pressing device 21 pushes the rising rail end 6 downward.

Figure 4:
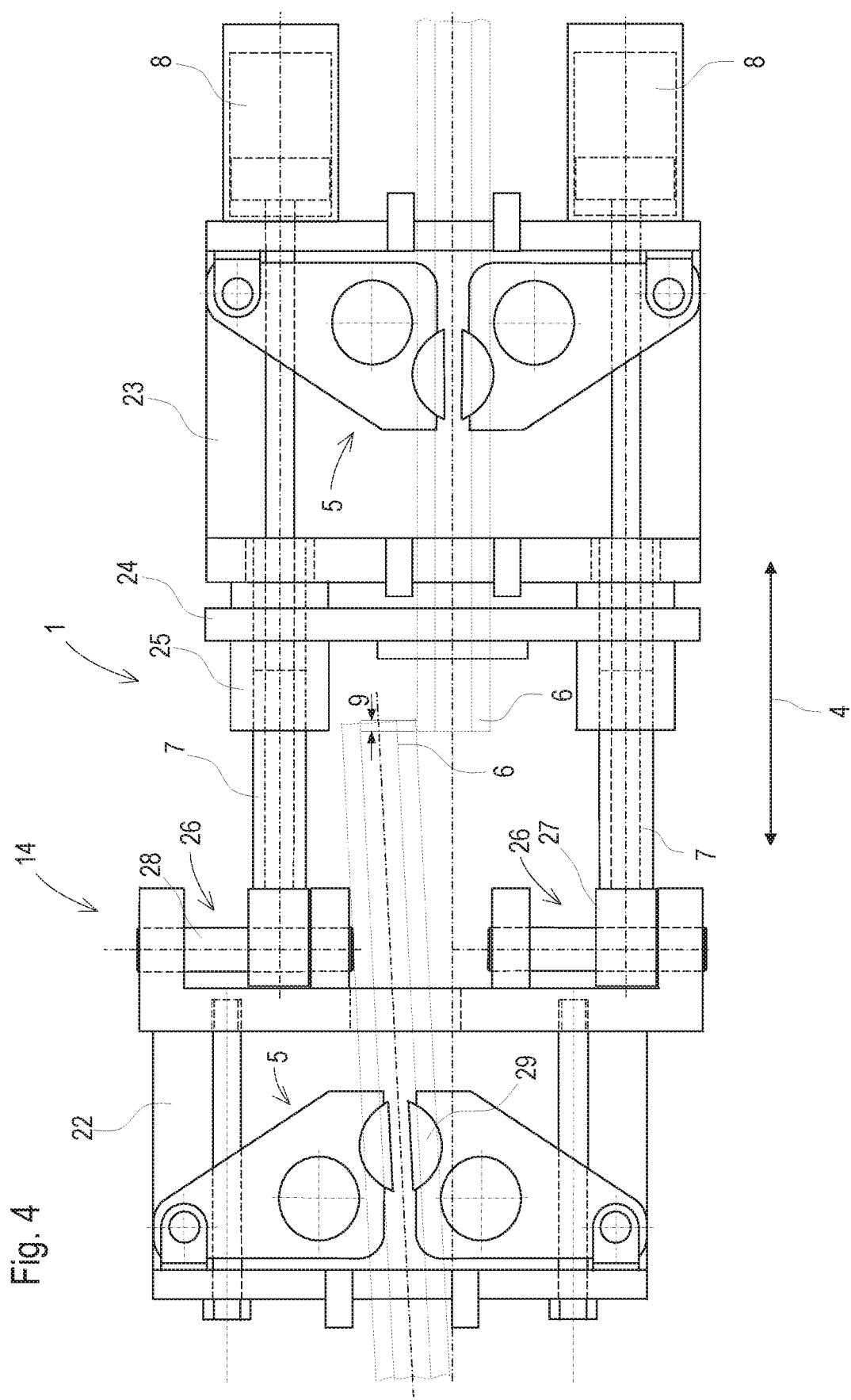

FIG. 4 shows a device 1, designed as a welding machine, with integrated push rods 7 and integrated transverse displacement device 14. For example, a welding head for flash-butt welding is divided into a first welding head half 22 and a second welding head half 23 in which one rail end 6 in each case is clamped by means of an associated rail clamping device 5. A shearing device 24 for removing a weld bead is provided between the two welding head halves. Additionally, electrodes (not shown) are pressed to the rail ends 6.

By means of sleeves 25, the second welding head half 23 is mounted on the push rods 7 for displacement in the rail longitudinal direction 4 via first hydraulic cylinders 8. In order to make an overlapping 9 of the rail ends 6 disappear, the welding head halves 22, 23 with the rail ends 6 clamped therein are pressed apart.

Prior to welding, the two rail ends 6 are aligned laterally. To that end, as a transverse displacement device 14, the two push rods 7 are each mounted for displacement on a transverse guide 26. In the variant shown, the two push rods 7 have gliding blocks 27 at the ends which glide on gliding shafts 28 of the oppositely positioned first welding head half 22.

The transverse displacement device 14 comprises a second hydraulic cylinder 16 for displacing the first welding head half 22 laterally relative to the second welding head half 23. During this, movable clamping jaws 29 of the rail clamping devices 5 maintain the clamping forces acting on the rail ends 6.

After the two rail ends 6 have been flush-aligned, the two welding head halves 22, 23 are displaced relative to one another in the rail longitudinal direction 4 with electrical power supplied. In this, the first hydraulic cylinders 8 are actuated accordingly in order to first produce a gap between the rail ends 6 for generating an arc. After reaching a required welding temperature, the rail ends 6 are pressed upon one another and molten with one another.

Shown in FIG. 5 is the first welding head half 22 with the transverse displacement device 14. The second hydraulic cylinder 17 is arranged above the rail 30 situated in a recess. Via piston rods 31 guided out of the cylinder at both sides 17, a transverse displacement force is applied to the gliding blocks 27 fastened at the ends of the push rods 7. For example, the respective push rod 7 is screwed into a threaded blind hole of the associated gliding block 27.

The gliding shafts 28, the push rods 7 and the rail clamping devices 5 with the clamping jaws 29 are arranged on a horizontal plane to prevent bending stress in the supporting elements of the welding head. The transverse displacement force to be applied is significantly weaker than the pressing forces in the push rods and the clamping forces. Therefore, the flexing moments caused by the effective axis, extending above, of the second hydraulic cylinder 17 are negligible.

Provided above the transverse displacement device 14 parallel to the push rods 7 is a guide rod 32 to increase the stability of the welding head. In this, the center points of the transverse sections of the push rods 7 and the guide rod 32 form the corners of an isosceles triangle. For transverse displacement of the welding head halves 22, 23, the guide rod 32 has at one front side a transverse guide 26. The latter comprises, for example, two gliding blocks 27 gliding on gliding shafts 28.

FIG. 6 shows a side view of the two oppositely positioned welding head halves 22, 23. A locking device 33 is provided for fixation of the guide rod 32 in the aligned state. In this, the first welding head half 22 comprises a pin 35, longitudinally displaceable by means of a drive 34 and having an outer taper. As counter element, the guide rod 32 has a front-side bore 36 having an inner taper. As soon as the two welding head halves 22, 23 have been flush-aligned, the drive 34 shoves the pin 35 into the bore 36 in order to ensure a precise alignment of the two welding head halves 22, 23 during the welding operation.

A space-saving alternative transverse guide 26 of the guide rod 32 is shown in FIG. 7. Specifically here, gliding plates are arranged at the front sides of the divided guide rods 32, the gliding plates having a dovetail guide at facing sides. For fixation in the aligned state, a locking device 33 is provided again.

FIG. 8 shows an alternative transverse guide 26 for the ends of the push rods 7. In this, gliding profiles 37 are arranged at the first welding head half 22, and the gliding blocks 27 arranged on the push rods 7 have corresponding counter profiles 38. In FIG. 9, this transverse guide 26 is shown in a side view. Here also, dovetail guides represent a space-saving variant.

The device according to the invention is suited especially for exchanging short rail pieces a few meters in length, for example to replace faulty spots or thermite welds. In this, first a rail piece of approximately 2.5-5 meters is cut out of the line. The rail piece to be newly inserted is longer by two welding additions than the resultant gap at neutral temperature.

In the course of the welding to the first cutting end of the rail line, a reduction in length in the amount of the first welding addition takes place, and at the other cutting end the second welding addition remains as an overlapping 9. During this, the inserted rail piece is bent inward or outward in the elastic region. Subsequently, with the rail fastenings released (over approximately 50 meters), the rail ends 6 are pressed apart until the overlapping 9 disappears.

Finally, the rail ends 6 are flush-aligned by means of the transverse displacement device 14, and the closure weld causes a reduction in length in the amount of the second welding addition. If the rail temperature differs from the neutral temperature, the welding additions need to be adapted accordingly. In this manner, with the method according to the invention, a replacement of rail pieces is possible at any ambient temperature.

The invention claimed is:

1. A device for welding a rail joint of a track, comprising two rail clamping devices spaced from one another in a rail longitudinal direction which are connected to one another via push rods to press rail ends apart prior to welding, wherein at least one rail clamping device is coupled to a transverse displacement device for flush-aligning the rail ends after being pressed apart;
   wherein the transverse displacement device comprises transverse guides by means of which the push rods are guided for transverse adjustment.

2. The device according to claim 1, wherein the transverse displacement device comprises a second hydraulic cylinder for applying a transverse displacement force.

3. The device according to claim 1, wherein the transverse displacement device has a support device for support on a rail line extending parallel to the rail ends to be welded.

4. The device according to claim 1, wherein the transverse displacement device has a jib arm, and that a pressing device fastened to the jib arm is arranged for transverse displacement of a rail end.

5. The device according to claim 1, wherein the transverse guides have gliding shafts on which gliding blocks arranged at the ends of the push rods are mounted.

6. The device according to claim 1, wherein the transverse guides have gliding profiles, and that gliding blocks arranged at the ends of the push rods have corresponding counter-profiles.

7. The device according to claim 1, wherein the device is designed as an integrated welding machine.

8. The device according to claim 7, wherein the one rail clamping device is arranged in a first welding head half, and that the other rail clamping device is arranged in a second welding head half.

9. The device according to claim 8, wherein the two welding head halves can be fixed relative to one another in the transverse direction by means of a locking device.

10. The device according to claim 9, wherein the locking device comprises a pin, displaceable in the rail longitudinal direction, which is arranged on the first welding head half, and that the second welding head half has a guide rod with a front-end bore which receives the pin in the locked position.

11. The device according to claim 7, wherein the welding machine is designed as a welding head for flash-butt welding.

12. A method for welding a rail joint by means of a device according to claim 1, wherein, with the rail ends overlapping, one rail end is clamped in the one rail clamping device and the other rail end is clamped in the other rail clamping device, that the two rail ends are pressed apart until there is no more overlapping, that the rail ends are flush-aligned with one another by means of the transverse displacement device, and that the rail ends are welded to one another.

13. The method according to claim 12, wherein the rail ends are moved towards one another in a controlled manner during a flash-butt welding procedure.

\* \* \* \* \*